United States
Shimizu

[11] 3,731,989
[45] May 8, 1973

[54] WIDE ANGLE PHOTOGRAPHIC LENS SYSTEM

[75] Inventor: Yoshiyuki Shimizu, Kawasaki, Japan

[73] Assignee: Nippon Kogaku K.K., Tokyo, Japan

[22] Filed: Dec. 9, 1971

[21] Appl. No.: 206,358

[30] Foreign Application Priority Data

Dec. 15, 1970   Japan ............................... 45/111286

[52] U.S. Cl. .................................. 350/216, 350/209
[51] Int. Cl. ........................................... G02b 9/60
[58] Field of Search ................... 350/216, 214, 215

[56] References Cited

FOREIGN PATENTS OR APPLICATIONS 26,133    12/1963   Japan ............................... 350/215
931,063    7/1963   Great Britain ..................... 350/216

*Primary Examiner*—John K. Corbin
*Attorney*—Joseph M. Fitzpatrick et al.

[57] ABSTRACT

A wide angle photographic lens system comprises five single lenses and provides for a relative aperture of F/2.8, an angle of field of 62° and a back focus about 1.1 times as long as the focal length. As viewed in the direction of travel of light, the first of the five lenses is a negative meniscus lens convex to the object side of the system, the second lens a positive biconvex lens, the third lens a negative biconcave lens, the fourth lens a positive meniscus lens concave to the object side, and the fifth lens a positive biconvex lens. An aperture stop is interposed between the second and third lenses. When the total focal length of the lens system is represented by $f$, the system satisfies the conditions that the air gap between the first and second lenses be in the range from $0.2f$ to $0.6f$, that the air gap between the second and third lenses be in the range from $0.15f$ to $0.25f$, that the radius of curvature of the image-facing surface of the second lens have an absolute value in the range from $0.9f$ to $1.5f$, and that the back focus of the system be in the range from $0.9f$ to $1.2f$.

3 Claims, 6 Drawing Figures

SPHERICAL ABERRATION
SINE CONDITION

ASTIGMATISM
MERIDIONAL -----
SAGITAL ———

DISTORTION

SPHERICAL ABERRATION ———
SINE CONDITION ———

ASTIGMATISM
MERIDIONAL ----
SAGITAL ———

DISTORTION 3,731,989

WIDE ANGLE PHOTOGRAPHIC LENS SYSTEM

BACKGROUND OF THE INVENTION

1. Field of the Invention

This invention relates to photographic systems, and more particularly to graphic lens system.

2. Description of the Prior Art

Photographic lenses for single lens reflex cameras or cine cameras must necessarily have a back focus longer than a predetermined value. However, such lenses of the ordinary type have a back focus shorter than their focal length and the short focus lenses having a back focus shorter than a predetermined value cannot be used with cameras whose rearward portion is limited in dimensions. In view of this, Japanese Pat. No. 314,719 has already proposed a retrofocus-type wide angle photographic lens which has a back focus longer than its total focal length $f$, but shorter than $1.5f$ and which comprises six lens components such as four single lenses of positive focal length (biconcave and meniscus lenses) and two single lenses of negative focal length (biconcave and meniscus lenses). In an example of the lens system as disclosed in that patent, however, the single lens of positive focal length (convex lens), which is nearest to the object, is provided to correct the negative distortional aberration which often appears in an inverted telephoto lens having an angle of field greater than 75°, and a back focus longer than $1.3f$. In the inverted telephoto lens, such negative distortional aberration tends to increase in proportion to the increase in the angle of field and in the back focus. Therefore, if the effective angle of field is limited to the order of 60° and the back focus is limited to the order of $1.1f$, then that single lens (convex lens) provided nearest to the object may be eliminated and thus the lens system disclosed in the aforesaid patent may be simplified in construction by employing only five single lenses. The back focus limited to the order of $1.1f$ will also be useful to decrease the F-number of the lens.

SUMMARY OF THE INVENTION

The present invention seeks to realize a wide angle photographic lens system of excellently corrected aberrations which comprises five single lenses and has a relatively aperture of F/2.8, and angle of field 62° and a back focus as long as $1.1f$ or near.

According to the present invention, the wide angle photographic lens system comprises first to fifth single lenses and an aperture stop disposed between the second and third lenses. The first and third single lenses are of negative focal length, the first lens being a meniscus lens convex to the object side of the system and the third single lens being a biconcave lens. The second, fourth and fifth single lenses are of positive focal length, the second and fifth lenses being biconvex lenses and the fourth single lens being a meniscus lens concave to the object side of the system. When the total focal length of the lens system is $f$, the axial spacing between the first and second lenses is greater than $0.2f$, but smaller than $0.6f$, and the axial spacing between the second and third lenses having the aperture stop interposed therebetween is greater than $0.15f$, but smaller than $0.25f$. The radius of curvature of the image-facing surface of the second lens has an absolute value greater than $0.9f$, but smaller than $1.5f$. Thus, the back focus of the lens system is greater than $0.9f$, but smaller than $1.2f$.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification wherein.

DESCRIPTION OF THE PREFERRED EMBODIMENTS

Figure 1:
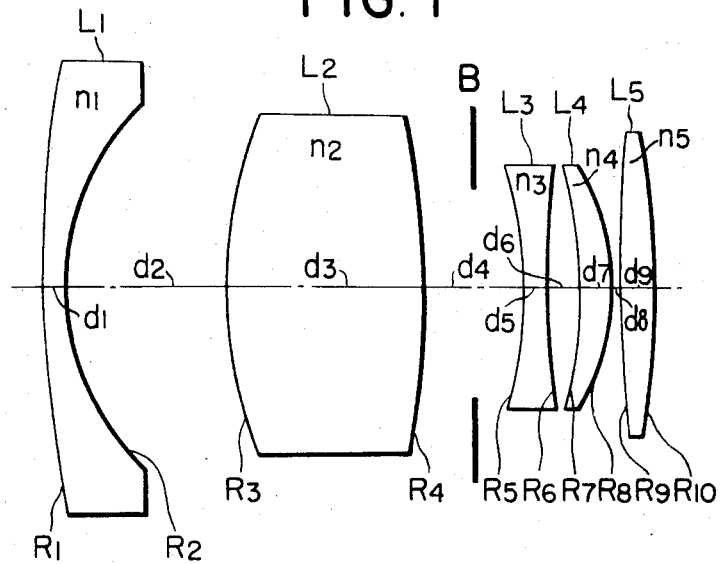
FIGS. 1, 3, and 5 are longitudinal sections of Examples I, II and III of the wide angle photographic lens system according to the present invention.
Figure 2A:
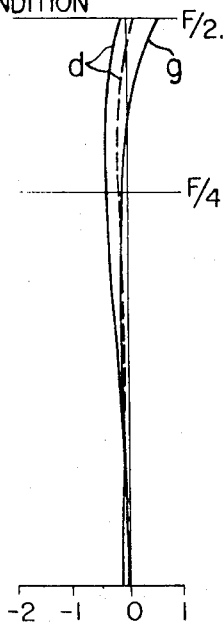
FIGS. 2A–2C, FIGS. 4A–4C and FIGS. 6A–6C are graphical illustrations of various aberrations in Examples I, II and III, wherein (A) shows the sperical aberration and sine condition ($d$ and $g$ represent $d$-line yellow ray and $g$-line green ray), (B) the astigmatism and (C) the distortional aberration.
Figure 2B:
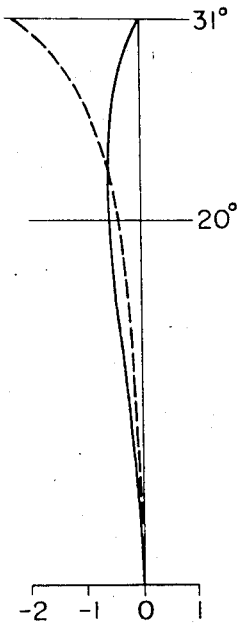
Figure 2C:
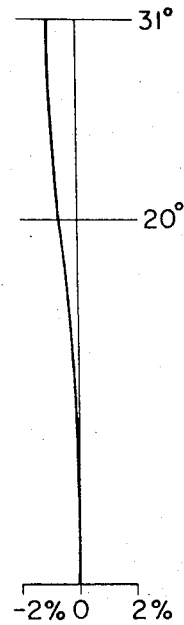
Figure 3:
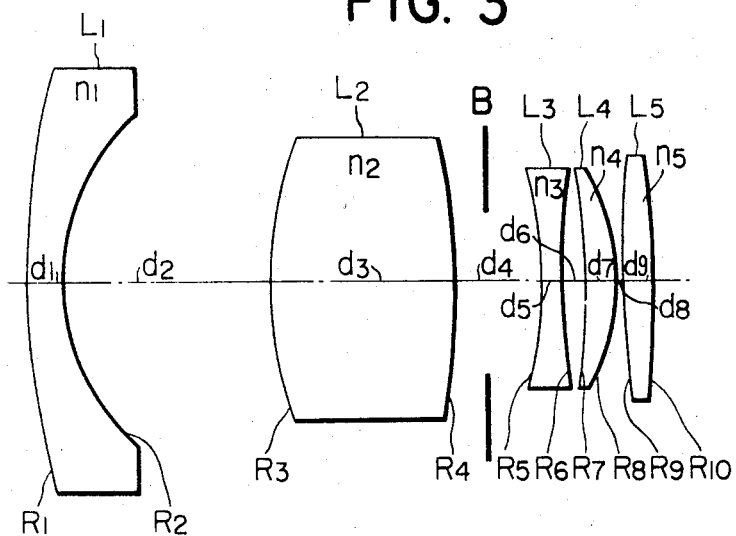
Figure 4A:
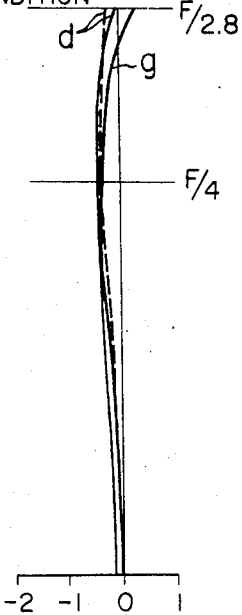
Figure 4B:
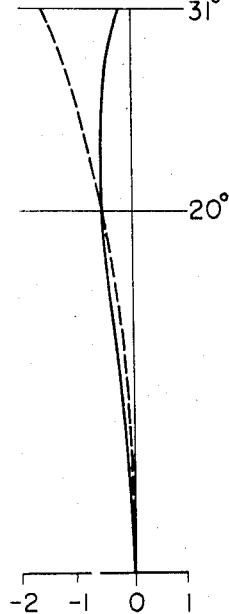
Figure 4C:
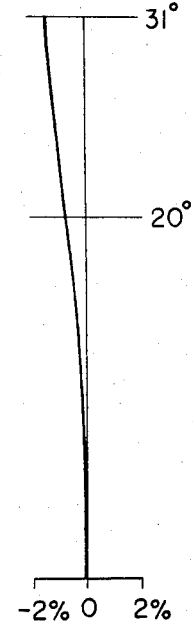
Figure 5:
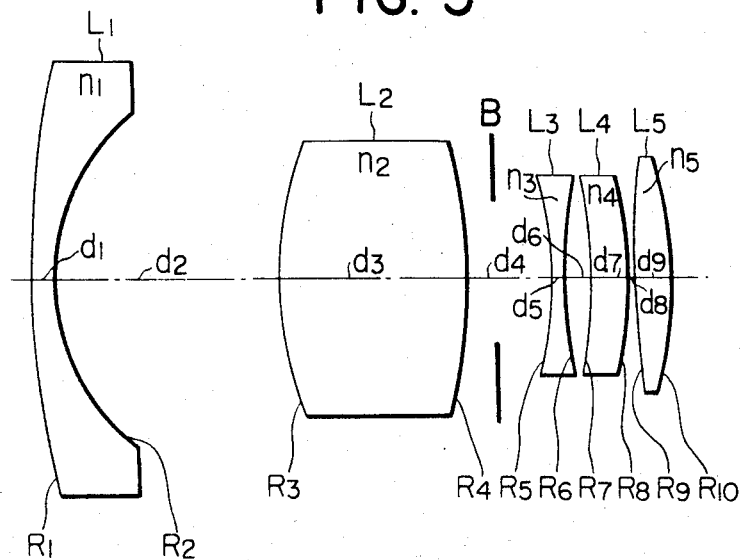
Figures 6A, 6B, 6C:
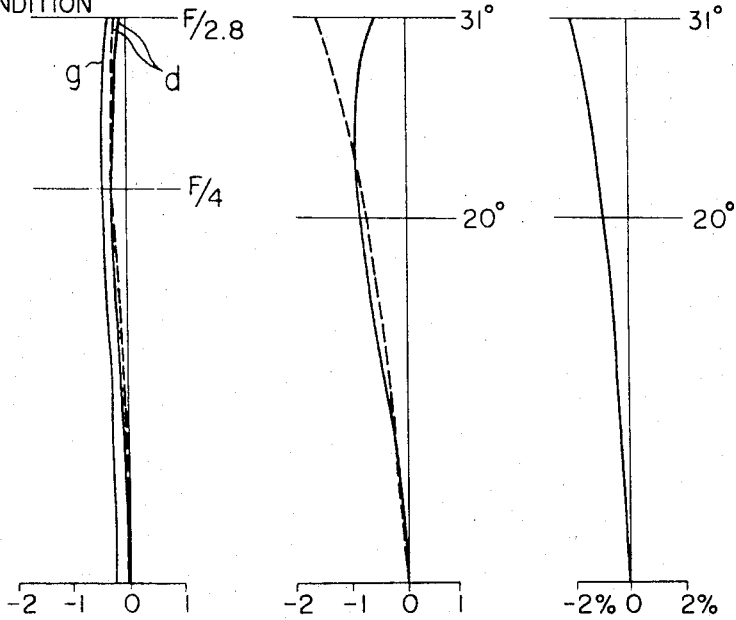

Referring to FIGS. 1, 3 and 5, the lens system of the present invention comprises five lenses such as $L_1$ to $L_5$ sequentially arranged in the direction of travel of light. The first lens $L_1$ is a meniscus lens of negative focal length with its convex surface facing the object. The second lens $L_2$ is a biconvex lens of positive focal length, and the third lens $L_3$ is a biconcave lens of negative focal length. The fourth lens $L_4$ is a meniscus lens of positive focal length with its concave surface facing the object. The fifth lens $L_5$ is a biconvex lens of positive focal length. An aperture stop B is interposed between the lens $L_2$ and the lens $L_3$. As a rule, a greater air gap between the lenses $L_1$ and $L_2$ than between the lenses $L_2$ and $L_3$ is useful for better correction of various aberrations, but too great an air gap will increase the dimensions of the entire lens system and this will mean a mechanical disadvantage. Conversely, too small an air gap will make it impossible to provide a long back focus. Thus, in order to provide a back focus about 1.1 times as long as the total focal length $f$, the air gap between the lenses $L_1$ and $L_2$ should advisably be within the range from $0.2f$ to $0.6f$. The air gap between the lens $L_2$ and the lens $L_3$ should be longer than $0.15f$, but shorter than $0.25f$. This spacing is sufficient to interpose the aperture stop B and convenient to mount a preset or automatic stop mechanism. The radius of curvature $R_4$ of that surface of the lens $L_2$ which faces the image must be selected to be of a value between $0.9f$ and $1.5f$. This arrangement is very effective to correct both the over-corrected spherical aberration resulting from the lens $L_1$ and the inner coma arising from the same lens. In other words, due to the aperture stop disposed behind the lens $L_2$, the light rays passing through the lens $L_1$ to produce the inner coma is subjected to a greater refraction in the image-facing surface of the lens $L_2$ than the principal ray, and such refraction is in a direction to correct the inner coma. If the radius of curvature $R_4$ of the lens $L_2$ exceeds the prescribed range, the inner coma will not be corrected. Conversely, a value of $R_4$ lower than that range will result in too great an action of that surface and accordingly, creation of an outer coma.

Various examples of the present invention are shown in the following tables, wherein R represents the radius of curvature of each lens, $d$ the center thickness of each lens or inter-lens air gap, $n$ the refractive index of each optical glass for D-line of sodium, and $\nu$ the Abbe number.

Example I $f = 100.0$  $F/2.8$  Angle of field 62°

$B.f. = 107.345$

| | | | |
|---|---|---|---|
| $L_1$ | $R_1=+161.1\ d_1=4.2$ | $n_1=1.5168$ | $\nu_1=64.2$ |
| | $R_2=+41.9\ d_2=27.8$ | | |
| $L_2$ | $R_3=+68.1\ d_3=36.1$ | $n_2=1.713$ | $\nu_2=53.9$ |
| | $R_4=-133.3\ d_4=17.5$ | | |
| $L_3$ | $R_5=-58.3\ d_5=4.4$ | $n_3=1.74077$ | $\nu_3=27.5$ |
| | $R_6=+143.6\ d_6=3.9$ | | |
| $L_4$ | $R_7=-76.7\ d_7=7.2$ | $n_4=1.77279$ | $\nu_4=49.5$ |
| | $R_8=-46.4\ d_8=0.3$ | | |
| $L_5$ | $R_9=+305.6\ d_9=6.7$ | $n_5=1.713$ | $\nu_5=53.9$ |
| | $R_{10}=-109.95$ | | |

Example II $f = 100.0$  $F/2.8$  Angle of field 62°

$B.f. = 108.427$

| | | | |
|---|---|---|---|
| $L_1$ | $R_1=+155.6\ d_1=7.0$ | $n_1=1.51823$ | $\nu_1=59.0$ |
| | $R_2=+40.7\ d_2=39.7$ | | |
| $L_2$ | $R_3=+68.9\ d_3=37.2$ | $n_2=1.713$ | $\nu_2=53.9$ |
| | $R_4=-111.7\ d_4=17.2$ | | |
| $L_3$ | $R_5=-50.0\ d_5=3.6$ | $n_3=1.71736$ | $\nu_3=29.5$ |
| | $R_6=+131.9\ d_6=3.6$ | | |
| $L_4$ | $R_7=-138.9\ d_7=7.0$ | $n_4=1.74443$ | $\nu_4=49.4$ |
| | $R_8=-47.2\ d_8=0.3$ | | |
| $L_5$ | $R_9=+325.0\ d_9=7.0$ | $n_5=1.62041$ | $\nu_5=60.3$ |
| | $R_{10}=-184.84$ | | |

Example III $f = 100.0$  $F/2.8$  Angle of field 62°

$B.f. = 104.665$

| | | | |
|---|---|---|---|
| $L_1$ | $R_1=+140.0\ d_1=6.0$ | $n_1=1.51454$ | $\nu_1=54.6$ |
| | $R_2=+47.5\ d_2=52.0$ | | |
| $L_2$ | $R_3=+82.5\ d_3=42.3$ | $n_2=1.74443$ | $\nu_2=49.4$ |
| | $R_4=-135.0\ d_4=21.0$ | | |
| $L_3$ | $R_5=-59.5\ d_5=3.5$ | $n_3=1.72825$ | $\nu_3=28.3$ |
| | $R_6=+119.0\ d_6=4.0$ | | |
| $L_4$ | $R_7=-146.5\ d_7=10.5$ | $n_4=1.713$ | $\nu_4=53.9$ |
| | $R_8=-67.0\ d_8=0.1$ | | |
| $L_5$ | $R_9=+279.67\ d_9=9.4$ | $n_5=1.62041$ | $\nu_5=60.3$ |
| | $R_{10}=-91.15$ | | |

As has been noted above, a positive lens is disposed just before the aperture stop B and two positive lenses are disposed behind the negative lens immediately following the stop B. Such arrangement increases the back focus and reduces the refraction in the forward lens group to prevent occurrence of various aberrations and thereby provide an advantage in the correction of aberrations. Thus, the lens system of the present invention greatly reduces a high degree of coma and spherical aberration and achieves an excellent reproducibility of low-contrast objects.

Also, in spite of its back focus being longer than its focal length and of its wide angle field, the lens system of the present invention produces only a very small distortional aberration and creates a greatly reduced coma over the entire field while providing an increased F-number, and thus a clear image field may be ensured, even for an open aperture stop.

I claim:

1. An inverted telephoto-type wide angle photographic lens system comprising first to fifth single lenses, and an aperture stop disposed between the second and third lenses, said first and third single lenses being of negative focal length, said first single lens being a meniscus lens convex to the object side of the system, said third single lens being a biconcave lens, said second, fourth and fifth single lenses being of positive focal length, said second and fifth lenses being biconvex lenses, said fourth single lens being a meniscus lens concave to the object side of the system, the axial spacing between said first and second lenses being greater than $0.2f$, but smaller than $0.6f$, the axial spacing between said second and third lenses with said aperture stop interposed therebetween being greater than $0.15f$, but smaller than $0.23f$, the radius of curvature of the image-facing surface of said second lens having an absolute value greater than $0.9f$, but smaller than $1.5f$, the back focus of said lens system being greater than $0.9f$, but smaller than $1.2f$, where $f$ is the total focal length of the lens system, in which the lens system satisfies the following data:

$f = 100.0$  $F/2.8$  Angle of field 62°

$B.f. = 107.345$

| | | | |
|---|---|---|---|
| $L_1$ | $R_1=+161.1\ d_1=4.2$ | $n_1=1.5168$ | $\nu_1=64.2$ |
| | $R_2=+41.9\ d_2=27.8$ | | |
| $L_2$ | $R_3=+68.1\ d_3=36.1$ | $n_2=1.713$ | $\nu_2=53.9$ |
| | $R_4=-133.3\ d_4=1.75$ | | |
| $L_3$ | $R_5=-58.3\ d_5=4.4$ | $n_3=1.74077$ | $\nu_3=27.5$ |
| | $R_6=+143.6\ d_6=3.9$ | | |
| $L_4$ | $R_7=-76.7\ d_7=7.2$ | $n_4=1.77279$ | $\nu_4=49.5$ |
| | $R_8=-46.4\ d_8=0.3$ | | |
| $L_5$ | $R_9=+305.6\ d_9=6.7$ | $n_5=1.713$ | $\nu_5=53.9$ |
| | $R_{10}=-109.95$ | | | where $L_1$, $L_2$, $L_3$, $L_4$ and $L_5$ represent the first to fifth single lenses, respectively, and wherein $R_1$, $R_2$ . . . $R_{10}$ represents the radius of curvature of the respective lenses; $d_1$, $d_2$ . . . $d_9$ represents the axial separation between consecutive refracting surfaces; $n_1$, $n_2$ . . . $n_5$ represents the refractive index of each optical glass for D-line of sodium; and $\nu_1$, $\nu_2$ . . . $\nu_5$ are the Abbe numbers of the respective lenses.

2. An inverted telephoto-type wide angle photographic lens system comprising first to fifth single lenses, and an aperture stop disposed between the second and third lenses, said first and third single lenses being of negative focal length, said first single lens being a meniscus lens convex to the object side of the system, said third single lens being a biconcave lens, said second, fourth and fifth single lenses being of positive focal length, said second and fifth lenses being biconvex lenses, said fourth single lens being a meniscus lens concave to the object side of the system, the axial spacing between said first and second lenses being greater than 0.2f, but smaller than 0.6f, the axial spacing between said second and third lenses with said aperture stop interposed therebetween being greater than 0.15f, but smaller than 0.23f, the radius of curvature of the image-facing surface of said second lens having an absolute value greater than 0.9f, but smaller than 1.5f, the back focus of said lens system being greater than 0.9f, but smaller than 1.2f, where $f$ is the total focal length of the lens system, in which the lens system satisfies the following data:

$f = 100.0$ $F/2.8$ Angle of field 62°

$B.f = 108.427$

| | | | |
|---|---|---|---|
| $L_1$ | $R_1=+155.6$ $d_1=7.0$ | $n_1=1.51823$ | $\nu_1=59.0$ |
| | $R_2=+40.7$ $d_2=39.7$ | | |
| $L_2$ | $R_3=+68.9$ $d_3=37.2$ | $n_2=1.713$ | $\nu_2=53.9$ |
| | $R_4=-111.7$ $d_4=17.2$ | | |
| $L_3$ | $R_5=-50.0$ $d_5=3.6$ | $n_3=1.71736$ | $\nu_3=29.5$ |
| | $R_6=+131.9$ $d_6=3.6$ | | |
| $L_4$ | $R_7=-138.9$ $d_7=7.0$ | $n_4=1.74443$ | $\nu_4=49.4$ |
| | $R_8=-47.2$ $d_8=0.3$ | | |
| $L_5$ | $R_9=+325.0$ $d_9=7.0$ | $n_5=1.62041$ | $\nu_5=60.3$ |
| | $R_{10}=-184.84$ | | | where $L_1$, $L_2$, $L_3$, $L_4$ and $L_5$ represent the first to fifth single lenses, respectively, and wherein $R_1, R_2 \ldots R_{10}$ represents the radius of curvature of the respective lenses; $d_1, d_2 \ldots d_9$ represents the axial separation between consecutive refracting surfaces; $n_1, n_2 \ldots n_5$ represents the refractive index of each optical glass for D-line of sodium; and $\nu_1, \nu_2, \ldots \nu_5$ are the Abbe numbers of the respective lenses.

3. An inverted telephoto-type wide angle photographic lens system comprising first to fifth single lenses, and an aperture stop disclosed between the second and third lenses, said first and third single lenses being of negative focal length, said first single lens being a meniscus lens convex to the object side of the system, said third single lens being a biconcave lens, said second, fourth and fifth single lenses being of positive focal length, said second and fifth lenses being biconvex lenses, said fourth single lens being a meniscus lens concave to the object side of the system, the axial spacing between said first and second lenses being greater than 0.2f, but smaller than 0.6f, the axial spacing between said second and third lenses with said aperture stop interposed therebetween being greater than 0.15f, but smaller than 0.23f, the radius of curvature of the image-facing surface of said second lens having an absolute value greater than 0.9f, but smaller than 1.5f, the back focus of said lens system being greater than 0.9f, but smaller than 1.2f, where $f$ is the total focal length of the lens system, in which the lens system satisfies the following data:

$f = 100.0$ $F/2.8$ Angle of field 62°

$B.f = 104.665$

| | | | |
|---|---|---|---|
| $L_1$ | $R_1=+140.0$ $d_1=6.0$ | $n_1=1.51454$ | $\nu_1=54.6$ |
| | $R_2=+47.5$ $d_2=52.0$ | | |
| $L_2$ | $R_3=+82.5$ $d_3=42.3$ | $n_2=1.74443$ | $\nu_2=49.4$ |
| | $R_4=-135.0$ $d_4=21.0$ | | |
| $L_3$ | $R_5=-59.5$ $d_5=3.5$ | $n_3=1.72825$ | $\nu_3=28.3$ |
| | $R_6=+119.0$ $d_6=4.0$ | | |
| $L_4$ | $R_7=-146.5$ $d_7=10.5$ | $n_4=1.713$ | $\nu_4=53.9$ |
| | $R_8=-67.0$ $d_8=0.1$ | | |
| $L_5$ | $R_9=-279.67$ $d_9=9.4$ | $n_5=1.62041$ | $\nu_5=60.3$ |
| | $R_{10}=-91.15$ | | | where $L_1$, $L_2$, $L_3$, $L_4$ and $L_5$ represent the first to fifth single lenses, respectively, and wherein $R_1, R_2 \ldots R_{10}$ represents the radius of curvature of the respective lenses; $d_1, d_2 \ldots d_9$ represents the axial separation between consecutive refracting surfaces; $n_1, n_2 \ldots n_5$ represents the refractive index of each optical glass for D-line or sodium; and $\nu_1, \nu_2 \ldots \nu_5$ are the Abbe numbers of the respective lens.

* * * * *